United States Patent
Sugino et al.

(10) Patent No.: US 7,512,888 B2
(45) Date of Patent: Mar. 31, 2009

(54) MANAGEMENT METHOD AND APPARATUS FOR STORAGE APPARATUS

(75) Inventors: Shoji Sugino, Odawara (JP); Kozue Fujii, Odawara (JP); Toshimichi Kishimoto, Hadano (JP); Dai Taninaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 618 days.

(21) Appl. No.: 10/294,468

(22) Filed: Nov. 13, 2002

(65) Prior Publication Data

US 2003/0093619 A1 May 15, 2003

(30) Foreign Application Priority Data

Nov. 14, 2001 (JP) ............................. 2001-349377
Apr. 23, 2002 (JP) ............................. 2002-120222

(51) Int. Cl.
*G06F 3/00* (2006.01)
(52) U.S. Cl. ..................... 715/734; 715/736; 715/740; 711/70; 711/114
(58) Field of Classification Search ......... 715/736–740, 715/853; 714/47; 711/170, 114
See application file for complete search history.

(56) References Cited

U.S. PATENT DOCUMENTS

| | | | | | |
|---|---|---|---|---|---|
| 5,375,199 | A | * | 12/1994 | Harrow et al. ............... | 715/771 |
| 5,506,955 | A | * | 4/1996 | Chen et al. ..................... | 714/26 |
| 5,559,958 | A | * | 9/1996 | Farrand et al. ................ | 714/27 |
| 5,623,598 | A | * | 4/1997 | Voigt et al. .................... | 714/47 |
| 6,009,466 | A | * | 12/1999 | Axberg et al. ................ | 709/220 |
| 6,173,289 | B1 | * | 1/2001 | Sonderegger et al. ... | 707/103 R |
| 6,243,105 | B1 | * | 6/2001 | Hoyer et al. .................... | 345/440 |
| 6,295,575 | B1 | * | 9/2001 | Blumenau et al. .............. | 711/5 |
| 6,346,954 | B1 | * | 2/2002 | Chu et al. ..................... | 715/764 |
| 6,446,141 | B1 | | 9/2002 | Nolan et al. | |
| 6,538,669 | B1 | * | 3/2003 | Lagueux et al. ............. | 715/764 |
| 6,542,961 | B1 | | 4/2003 | Matsunami et al. | |
| 6,553,408 | B1 | | 4/2003 | Merrell et al. | |
| 6,622,221 | B1 | * | 9/2003 | Zahavi ....................... | 711/154 |
| 6,640,278 | B1 | | 10/2003 | Nolan et al. | |
| 6,654,830 | B1 | | 11/2003 | Taylor et al. | |
| 6,671,776 | B1 | * | 12/2003 | DeKoning .................. | 711/114 |
| 7,058,560 | B1 | * | 6/2006 | Arakawa et al. ............. | 703/22 |
| 2003/0046041 | A1 | * | 3/2003 | Copel ............................ | 703/2 |
| 2003/0149753 | A1 | * | 8/2003 | Lamb .......................... | 709/223 |
| 2004/0012637 | A1 | * | 1/2004 | Alford et al. ................. | 345/772 |

FOREIGN PATENT DOCUMENTS

| JP | 05-151013 A | 6/1993 |
|---|---|---|
| JP | 08-137725 A | 5/1996 |
| JP | 2000-339098 A | 12/2000 |

* cited by examiner

*Primary Examiner*—Stephen S Hong
*Assistant Examiner*—Ryan F Pitaro
(74) *Attorney, Agent, or Firm*—Townsend and Townsend and Crew LLP

(57) ABSTRACT

A method for performing a system reconfiguration of a storage system includes displaying a configuration window visually showing a configuration of a plurality of components in the storage system within an operation screen. An input area is displayed within the operation screen, the input area being provided for entering one or more components to be reconfigured. A performance window is displayed within the operation screen, the preference window providing bandwidth utilization information of one or more of the components in the storage system. The configuration window, performance window, and the input area are all viewable at the same time without activating another operation screen.

19 Claims, 13 Drawing Sheets

FIG.10

Details of monitored data     80

| | Item | |
|---|---|---|
| 80a | WWN | IO/s or MB/s |
| 80b | WWN Grp | IO/s or MB/s (A plurality of WWNs are grouped) |
| 80c | CHA | IO/s or MB/s for each port |
| | | CHP utilization rate |
| 80f | DKA | DKP utilization rate |
| 80h | Parity group | IO/s<br>Cache Hit |
| | | Utilization rate<br>(Utilization rate at backend. Counting what is written actually into disk) |
| 80i | Logical volume | IO/s<br>Cache Hit |
| | | Utilization rate<br>(Utilization rate at backend. Counting what is written actually into disk) |

Configuration diagram before volume movement

FIG.13
(a): Typical display of volumes not to be moved
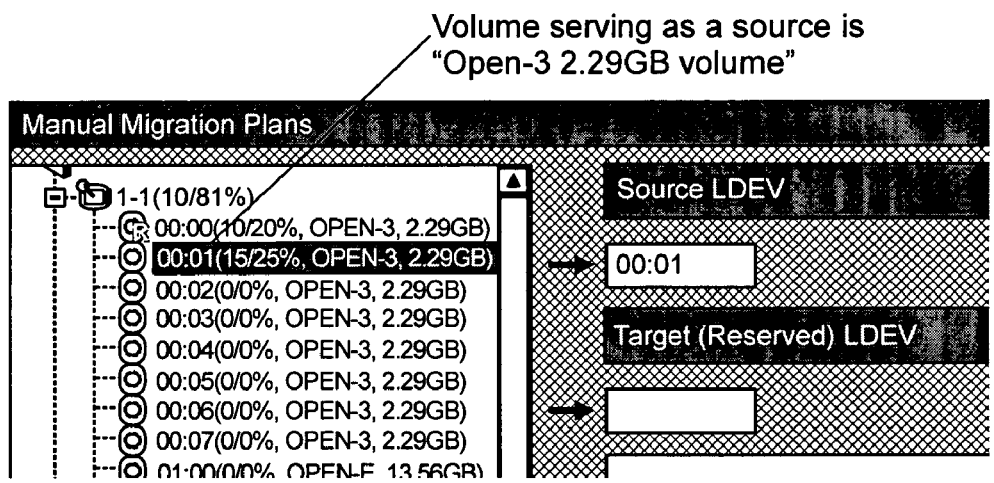
(b): Indication of volumes then can serve as the destination
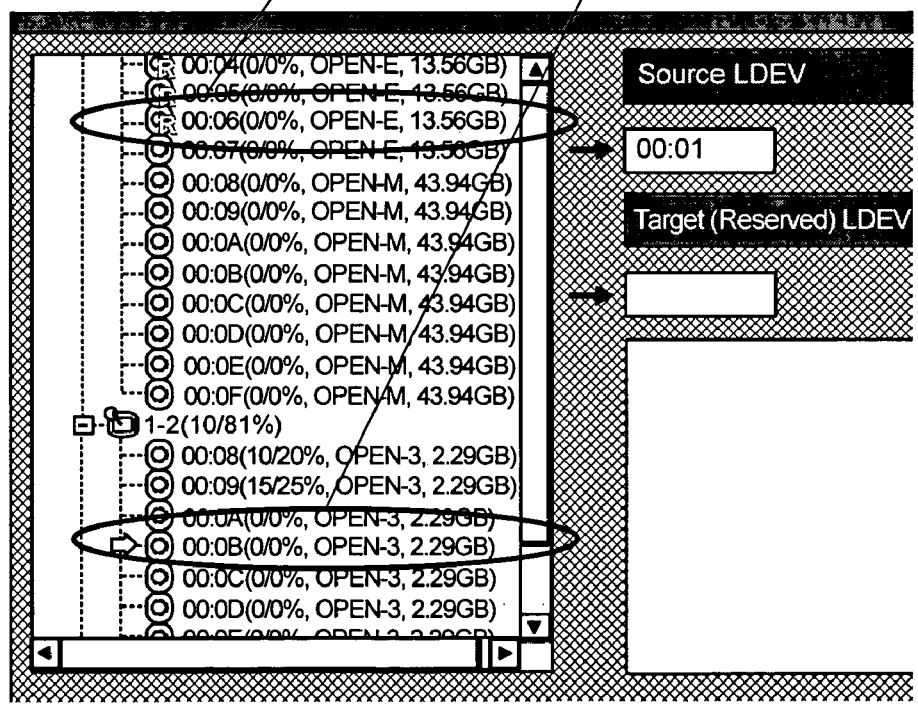

MANAGEMENT METHOD AND APPARATUS FOR STORAGE APPARATUS

CROSS-REFERENCES TO RELATED APPLICATIONS

The present application is related to and claims priority from Japanese Patent Application No. 2001-349377, filed on Nov. 14, 2001, and Japanese Patent Application No. 2002-120222, filed on Apr. 23, 2002.

BACKGROUND OF THE INVENTION

The present invention relates to storage system, more particularly to a method or apparatus for managing a storage subsystem or device.

In recent years, a plurality of information apparatus are combined in a complicated manner into a complex configuration for whose management there has been proposed a means such as a large-scale network requiring a skilled network administrator. In particular, the process to increase the capacity of a storage apparatus (e.g., a disk-array apparatus) is frequently performed. The configuration of a storage system has also been increasing in complexity in that a plurality of storage apparatuses are linked to a network for data transfer via the network. The capacity of a storage apparatus can be increased by employing large-size storage disks to operate concurrently in the storage apparatus. In this case, it is necessary to manage the storage disks in a uniform manner.

Instead of implementing a storage apparatus as a single large magnetic-disk apparatus, the storage apparatus can employ a number (e.g., more than 1000) of inexpensive small magnetic disks provided in a redundant configuration to operate concurrently. In such a configuration, data can be stored in two different disks for back-up purposes. Thus, the data input/output performance resulting from concurrent operations a device having a plurality of magnetic disks and data reliability can be improved.

Then, in response to a demand for increase of storage capacity of a disk-array apparatus and enhancement of reliability, the number of magnetic disk storages in the disk-array apparatus is increased. Accordingly, the configuration of the disk-array apparatus becomes complicated due to, among others, the fact that the internal configuration of a disk-array control apparatus becomes redundant. In addition, the number of logical volumes and other entities set in the disk-array apparatus can reach as high as 8000 or more. As a result, loads of physical and logical apparatus configurations' operation management and maintenance management increase significantly.

In addition, for the purpose of increasing the management efficiency, integrated remote maintenance management and the like are executed on a plurality of disk-array apparatus installed in different locations. A variety of set control parameters of a utility (a management application) implemented as a service processor (SVP) or the like provided in the disk-array is set. That is, a person in charge of storage-system management (system administrator) views a performance display screen to obtain information on load distribution, on the basis of which the control parameters are set and configuration information is changed.

In an operation to set the control parameters as described above, a system administrator of a storage subsystem (disk-array apparatus) generally can not determine the state of the entire apparatus by merely looking at one screen of the management application since mutual correlations exist in many instances. For this reason, a configuration design carried out on a desk while collecting many pieces of information from scattered sources is desirable.

With the configuration of a disk-array control apparatus keeping up with a disk-control apparatus having a large size and a large storage capacity, in a work carried out by a storage system administrator to execute volume control and set a variety of parameters for the purpose of configuring and improving the performance of the system based on load distribution, operations become complicated and difficult to determine consequences of such operations/implementations.

In addition, in a disk-array apparatus or system having a complicated configuration designed for a large size and a large storage capacity, e.g., an enterprise system, the current system's parameters and configuration are not easy to modify quickly. In one embodiment, one disk-array apparatus includes 1,000 or over more storage disks, providing over 8,000 logical volumes. There is also a danger that a system failure may result from performing certain reconfigurations or operations.

It is to be noted that, there is a personal computer or the like that allows video and audio data to be reproduced or playback from a compact disk serving as an external storage device in real time. With such a personal computer, however, the operations can be carried out to control the playback, e.g. controlling audio or video reproduction. The system's parameters and configuration, e.g., creating logical volumes, associating a particular parity group with one or more logical volumes, or other acts that effects where data are stored within a storage device, are not easy to modify immediately in real time. Such a personal computer thus provides a technique essentially different from the technique in which it is feared that an unexpected problem such as a system failure is raised in some setting operations (i.e., involving system configuration or reconfiguration). That is to say, in an operation to read out data from a compact disk, the original data itself generally is not lost due to a change in configuration.

BRIEF SUMMARY OF THE INVENTION

Embodiments of the present invention relates to a method and apparatus for managing storage subsystems: a management method adopted in a disk-array apparatus whereby utility software is provided in a magnetic-disk-array control apparatus to display a screen visually showing a configuration of the disk-array apparatus and a screen showing performance data of each components employed in the disk-array apparatus; a management method adopted in a disk-array apparatus whereby performance data of the disk array apparatus is displayed on a screen dynamically or using data over a specified period of time; a method of displaying a screen showing an effect of a change in apparatus configuration or the like on performance of the disk-array apparatus.

One embodiment of the present invention provides a capability of visually predicting effects of a proposed system reconfiguration. As used herein, the term "system reconfiguration" or "system configuration" is a setting operation or the like that sets or changes one or more parameters for controlling one or more logical volumes of a storage subsystem (e.g., defining a logical volume or relocating an existing logical volume to another parity group) and also including an operation that sets or modifies one or more parameters defining the physical configuration of the storage subsystem including the physical configuration of the plurality of storages devices in the storage subsystem. The terms "system configuration" and "system reconfiguration" are used interchangeably herein.

Another embodiment of the present invention relates to providing visual recognition of a configuration and function, and characteristics of each member to avoid carrying out problematic implementations.

In addition, in a system configuration operation, a simulation of the effects of the new system configuration is provided for the administrator to view in order to confirm the appropriateness of the system configuration being considered. As a result, the administrator is capable of changing the setting and information on the configuration with a high degree of safety even in the course of the apparatus processing. The simulation is performed using values of the storage subsystem past performances according to one embodiment of the present invention.

In one embodiment, a management method for a storage system is disclosed. The storage system includes a storage subsystem configured to store data, a plurality of components, a host computer configured to communicate data with the storage subsystem, and a system management device configured to provide management functions to the storage system. The method involves displaying a configuration window on a display area of the system management device, the configuration window providing configuration information of the plurality of components in the storage subsystem; and displaying a performance window on the display area of the system management device together with the configuration window, the performance window providing bandwidth utilization information relating to at least one of the plurality of components in the storage subsystem.

In another embodiment, a method for performing a system reconfiguration of a storage system includes displaying a configuration window visually showing a configuration of a plurality of components in the storage system within an operation screen. An input area is displayed within the operation screen, the input area being provided for entering one or more components to be reconfigured. A performance window is displayed within the operation screen, the preference window providing bandwidth utilization information of one or more of the components in the storage system. The configuration window, performance window, and the input area are all viewable at the same time without activating another operation screen.

In another embodiment, a computer readable medium includes codes for managing a storage subsystem configured to store data and including a plurality of components is disclosed. The medium includes code for displaying a configuration window on a display area of a system management device, the configuration window providing configuration information of the plurality of components in the storage subsystem, the system management device being configured to perform management functions on the storage subsystem; and code for displaying a performance window on the display area of the system management device together with the configuration window, the performance window providing bandwidth utilization information relating to at least one of the plurality of components in the storage subsystem.

In yet another embodiment, a storage system includes a storage subsystem including a plurality of storage locations; a host computer coupled to the storage subsystem to transmit a data request to the storage subsystem; a system management device configured to provide management functions to the storage system; and a computer readable medium. The medium includes code for displaying a configuration window on a display area of the system management device, the configuration window providing configuration information of the plurality of components in the storage subsystem, and code for displaying a performance window on the display area of the system management together with the configuration window, the performance window providing bandwidth utilization information relating to at least one of the plurality of components in the storage subsystem.

BRIEF DESCRIPTION OF THE DRAWINGS

FIG. 10 is an explanatory diagram showing typical information used in the storage-device management method according to one embodiment of the present invention.

FIG. 13 shows explanatory diagrams illustrating a screen according to one embodiment of the present invention.

DETAILED DESCRIPTION OF THE INVENTION

In accordance with the embodiments of the present invention, in an information apparatus such as a display apparatus having a complicated configuration, the configuration of the apparatus is visually displayed on an operation screen of an information-processing apparatus, such as a management apparatus, so that the operator may easily understand operations and effects of the operations. That is, a system administrator may view the states of loads of numerous logical devices existing in a disk-array apparatus or the like, on an operation screen of a storage management application executed on a management terminal, such as, a service processor provided on the disk-array apparatus. The system administrator or the person in charge of storage-system management then performs the system reconfiguration with a high degree of efficiency, so as to distribute the loads uniformly within the storage apparatus.

A first display window showing the system condition, e.g., the load distribution and system performance, before and after the system reconfiguration being considered and a second display window for modifying the composition of the configuration are displayed together according to one embodiment of the present invention. These display windows are used to perform system configuration, such as, set system parameters and change the apparatus configuration so as to improve the performance of the system and increase the efficiency of the operation-management and maintenance-management works. In addition, the windows also visually inform the operator whether or not a desired operation can be carried out. If a desired operation cannot be carried out, an operation screen provides an explanation of the reason why the desired operation or system configuration cannot be performed.

By combining a first display window showing the configuration of the apparatus with a second display window showing the performance of the apparatus together on a single screen, a relation between the configuration of the apparatus (or changes in apparatus configuration) and the performance of the apparatus (or changes in apparatus performance) can be grasped more easily. In order to change the configuration of the apparatus, the administrator can perform a drag-and-drop operation by using a pointing device such as a mouse or write new data directly into an input section on the screen to enter a change to a parameter list table. Accordingly, the administrator can avoid the complexity of the conventional system configuration operations and intuitively grasp a change in apparatus configuration. By visually displaying simulated results of a system configuration being considered on the screen, the effect of performing the system configuration can be estimated with ease.

Figure 8:
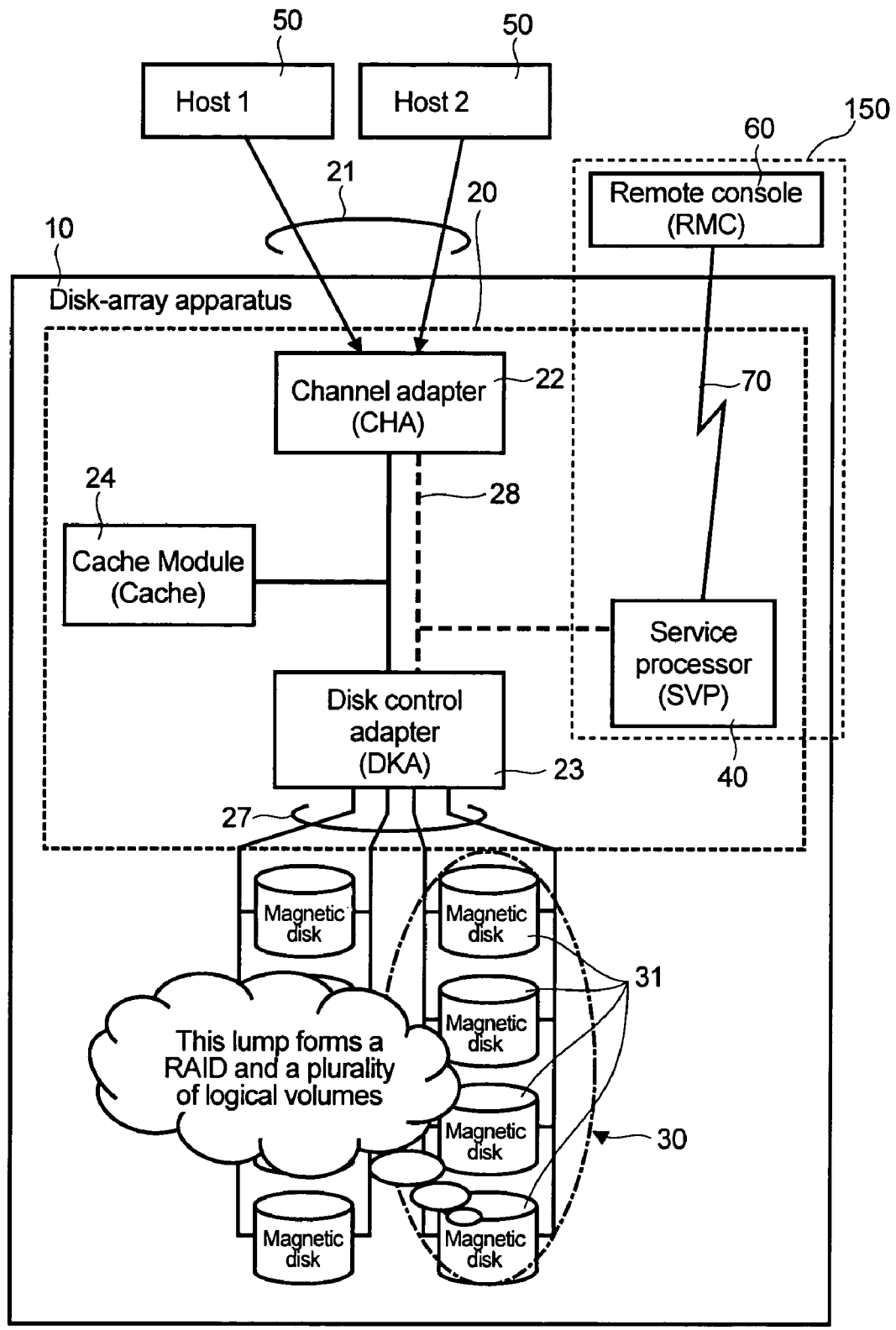
FIG. 8 is a block diagram showing a typical configuration of the storage apparatus serving as an object of management of the management apparatus adopting the storage-device management method according to one embodiment of the present invention.
Figure 9:
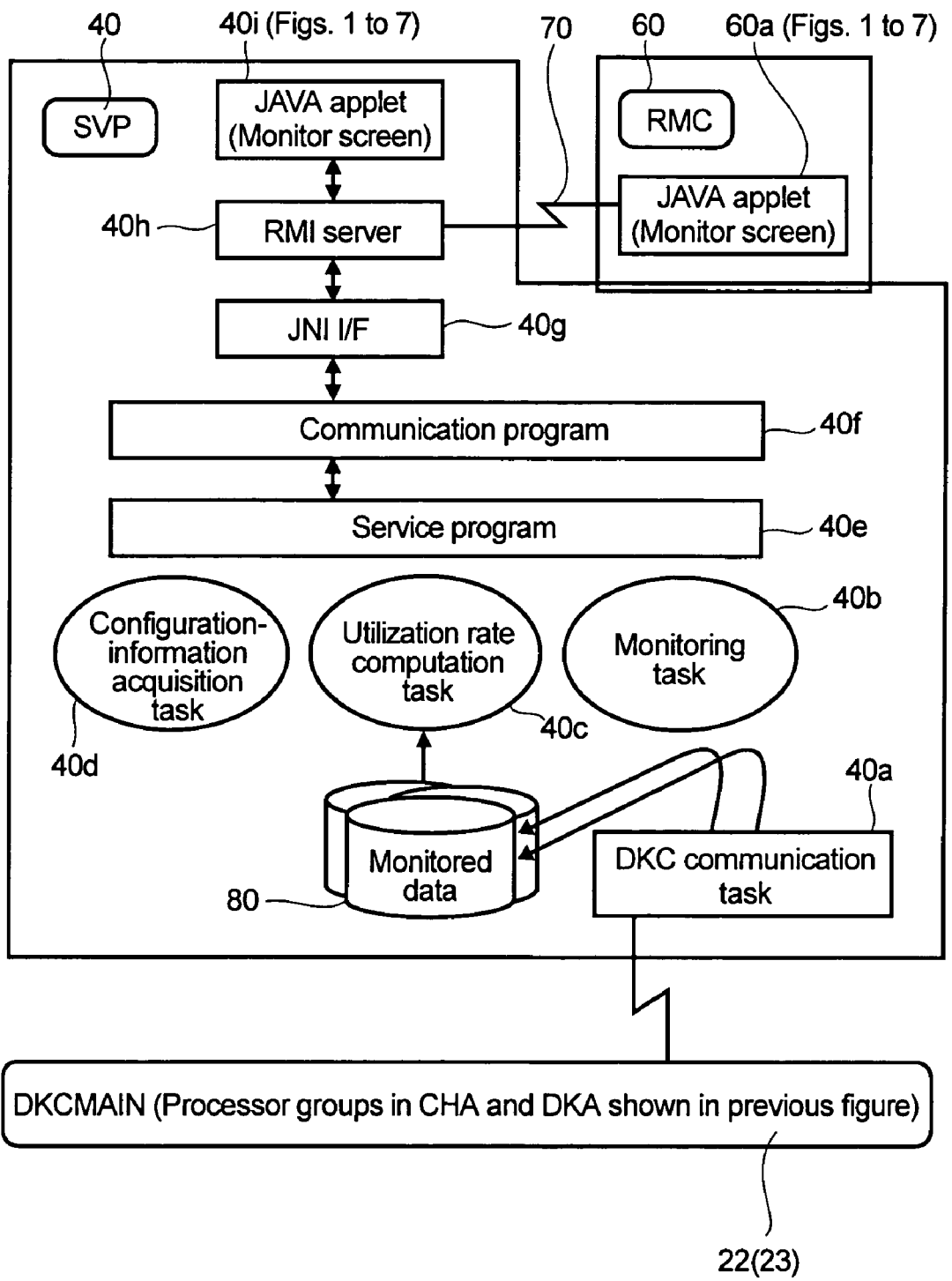
FIG. 9 is a conceptual diagram showing a typical structure of software included in the management apparatus adopting the storage-device management method according to one embodiment of the present invention.
Figure 11:
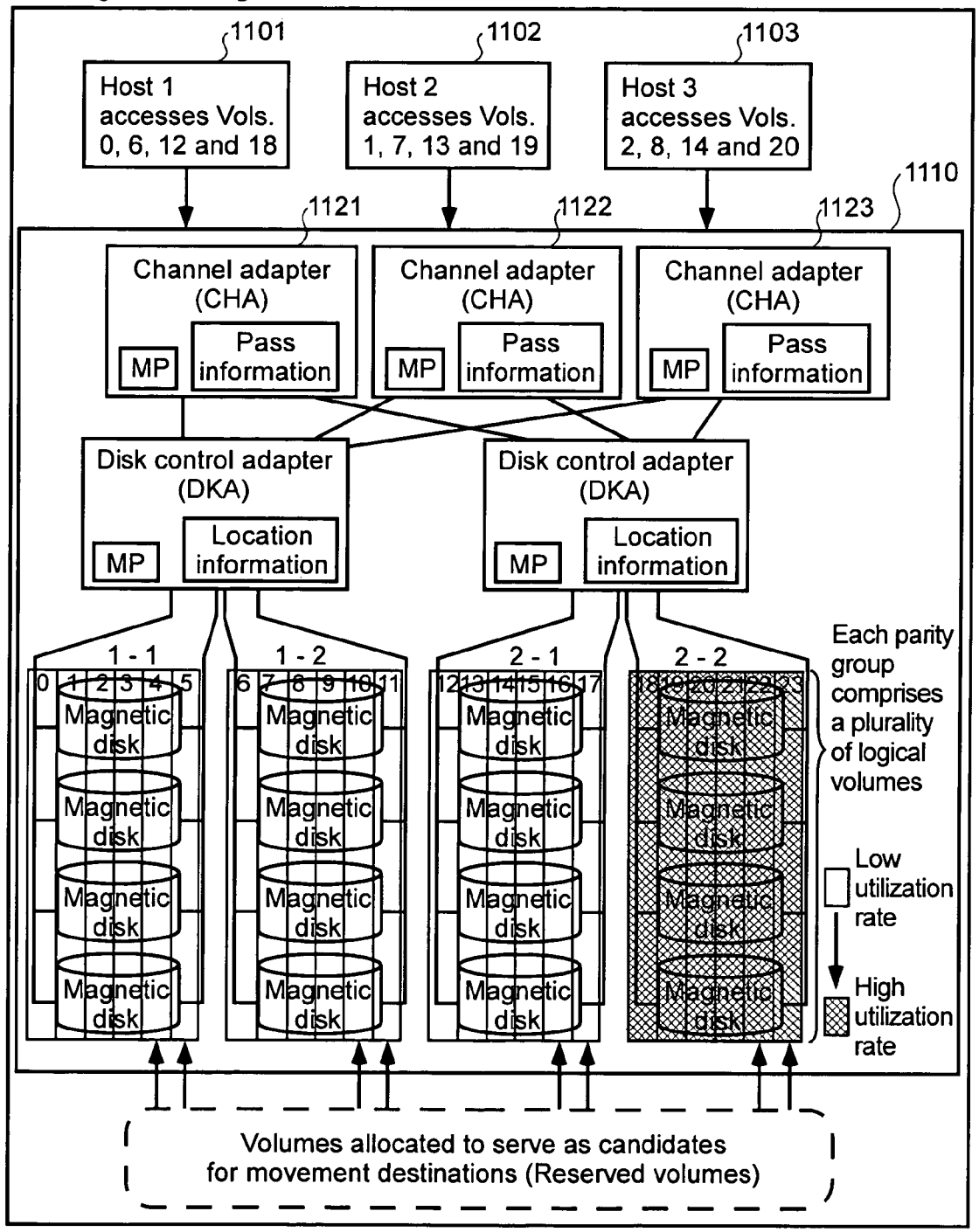
FIG. 11 is an explanatory diagram showing a configuration of a storage device according to one embodiment of the present invention.
Figure 12:
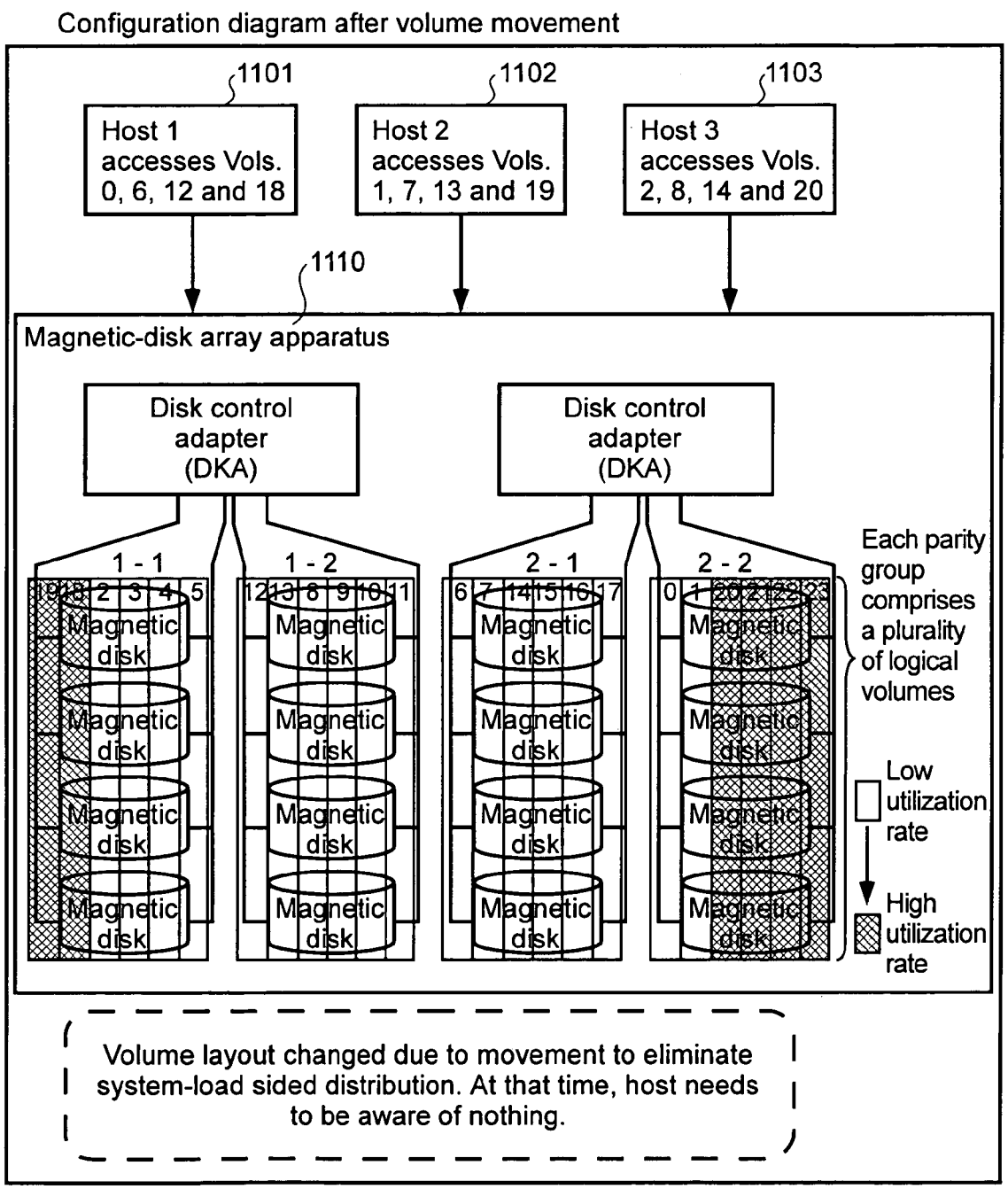
FIG. 12 is an explanatory diagram showing a configuration of a storage device according to one embodiment of the present invention is applied.

Preferred embodiments of the present invention will be described in detail with reference to the drawings. FIGS. 1, 2, 3, 4, 5, 6 and 7 are each a schematic diagram showing an exemplary operation screen of a management apparatus adopting a management method of a storage apparatus according to an embodiment of the present invention. The management apparatus is generally a personal computer system or a server system that is coupled to a storage subsystem or disk-array apparatus. FIG. 8 is a block diagram showing a schematic configuration of a storage subsystem serving as a management object of a management apparatus adopting a management method of the storage apparatus according to one embodiment. FIG. 9 is a schematic diagram showing a typical organization of software in a management apparatus adopting a management method according to one embodiment. FIG. 10 is an explanatory diagram showing typical information used in a management method according to one embodiment. FIG. 11 is an explanatory diagram showing a logical volume's set information, which is typical information used in a management method according to one embodiment. In particular, FIG. 11 shows a state in which logical volumes each having a high rate of utilization is concentrated on a parity group, resulting in an overhead. FIG. 12 is a configuration optimized according to one embodiment for an overhead like the one shown in FIG. 11. FIG. 13 is a diagram showing a typical operation screen according to another embodiment of the present invention.

FIG. 8 shows a disk-array apparatus associated with a management method according to one embodiment of the present invention. As shown in the figure, a disk-array apparatus 10 (storage subsystem) comprises a disk-array control apparatus 20, disk arrays 30 controlled by the disk-array control apparatus 20 and a service processor (SVP) 40. In the present embodiment, the service processor 40 is a functional unit employed in the disk-array control apparatus 20. However, the service processor 40 can also be implemented by an external apparatus, which issues instructions to the disk-array control apparatus 20 through a local area network (LAN). As another alternative, the disk-array control apparatus 20 is operated from a remote location through a public line such as the Internet.

The disk-array control apparatus (DKC) 20 includes a plurality of channel adapters (CHA) 22, a plurality of disk control adapters (DKA) 23 and a cache memory (CACHE) 24. Each of the channel adapters 22 has a channel processor (CHP) for controlling exchanges of information with a host computer 50 through a channel port or communication link 21, which is typically a Fibre Channel. Each of the disk control adapters 23 is provided with a disk processor (DKP) for controlling a disk array 30 arranged in a RAID format or the like. The cache memory 24 is used for temporarily storing data read out or written by the host computer 50. The host computer may be a computer that is coupled to the storage subsystem via a server, as in a storage area network (SAN), or a computer that is coupled to the storage subsystem via the channel port without the server, as illustrated in FIG. 8. Alternatively, the host computer may be a server within the SAN. The host may also be referred to as a client since it transmits read and write requests to the storage subsystem.

Each of the channel adapters 22 and the disk control adapters 23 has a network interface not shown in the figure. The network interface is connected to the service processor 40 by an internal network 28, e.g., a LAN, so that operations and other processing carried out by the disk-array apparatus 10 can be managed by the service processor 40 or by an external remote management terminal (a remote control) 60 or the like, which is connected to the service processor 40 by an information network 70 such as the Internet.

A disk array 30 comprises a plurality of magnetic-disk drives 31 forming a redundant configuration. The magnetic-disk drives 31 are connected to a disk-control adapter 23 by a plurality of disk ports 27. In the magnetic-disk drives 31 put in a redundant configuration, a parity group is formed including one or more disk drives. A logical volume is formed in or associated with a single parity group or a plurality of parity groups. Alternatively, a plurality of logical volumes can also be defined in or associated with a single parity group.

FIG. 11 is a diagram conceptually showing a relationship between a logical volume and a physical disk array in a disk-array apparatus. The embodiment provides a typical apparatus in which an application program is executed.

In general, an information apparatus having a complicated hardware configuration like the disk-array apparatus is presented in such a form that the user of the information apparatus can use the apparatus without being aware of the complicated hardware configuration. In the figure, reference numerals 1101, 1102 and 1103 each denote a host computer issuing instructions to a storage apparatus 1110. Instructions issued by the hosts 1101, 1102 and 1103 to the storage apparatus 1110 are instructions for reading out and writing data from and into the storage apparatus 1110.

In this case, the hosts 1101, 1102 and 1103 do not consider the accessed data's physical location in a magnetic disk in the storage subsystem 1110. One or more logical storage areas referred to as logical volumes are assigned to each of the hosts 1101, 1102 and 1103, and the hosts 1101, 1102 and 1103 issue read and write instructions directed to respective logical volumes disregarding the actual physical location of the data. The logical volumes also are associated with respective logical units that hosts use to identify the desired logical volume to be accessed. The logical unit is an entity within a target and executes I/O commands sent to the target. The logical units are provided with logical unit numbers (LUN), so that each one of them could be identified from other logical units. The storage subsystem 1110, accordingly, uses a management program to determine the correlation between the physical location and the logical units specified by the hosts. That is, the storage subsystem 11 10 executes the management program and accesses a variety of tables indicating which location in a magnetic disk (physical location) corresponds to a logical unit specified by a host.

The storage device shown in the figure has a RAID configuration comprising a combination of a plurality of magnetic disks constituting a parity group. The figure shows a storage device with a configuration comprising four parity groups 1-1, 1-2, 2-1 and 2-2. The parity group 1-1 is divided into a plurality of logical volumes 0, 1, 2, 3, 4, and 5, each extending over a plurality of magnetic disks. Similarly, the parity groups 1-2, 2-1, and 2-2 are divided into a plurality of logical volumes as well. The storage subsystem has location information associating a particular parity group with one or more logical volumes. The location information is part of configuration information and change of this information constitutes system configuration or reconfiguration.

On the other hand, association of logical units with logical volumes is managed by a microprocessor provided in each of the channel adapters 1121, 1122 and 1123 by using a management table according to one embodiment of the present invention. That is to say, when the host specifies a storage area by using a logical unit number that identifies the logical unit, a management table is searched for a logical volume for the storage area and data is read out from or written into the logical volume.

The management table includes "pass information" that associates the logical volumes with corresponding logical unit. The logical volume, from which the data is read or to which the data is written, may be changed by modifying the pass information. The pass information provides configuration information of the storage subsystem, and any modification or addition to the pass information is considered to be a system configuration or reconfiguration operation.

That is to say, by using the pass information, the storage subsystem 1110 determines which logical volume corresponds to a logical unit specified in a read or write request made by a host. Then, by using the location information, the storage subsystem 1110 determines which parity group includes the identified logical volume. Finally, the storage subsystem 1110 identifies a location on a magnetic disk, so that the read or write request may be carried out using the identified location.

By modifying such configuration information (e.g., pass information) on the storage side, it is possible to alter a location to where data is to be read out from or written into without involving the host.

In the embodiment shown in the figure, a shaded portion represents logical volumes having a high rate of utilization, i.e., where the load is heavy. More specifically, the logical volumes having a high rate of utilization are concentrated in the parity group 2-2. If logical volumes having a high rate of utilization are concentrated in the same parity group, there will be contention to access theses volumes in the same parity group. As a result, the throughput unavoidably decreases. This is because accesses to logical volumes pertaining to the same parity group cannot be physically made at the same time.

In order to solve the above problem, it is desirable to move a frequently accessed logical volume to a parity group comprising logical volumes with lighter load, i.e., having a relatively low rate of utilization, so as to distribute the loads more uniformly with the storage subsystem. It is preferable to replace a heavily accessed logical volume with a reserved logical volume prepared in advance in a parity group.

FIG. 12 illustrates a case where logical volumes experiencing a high rate of utilization have been relocated to another parity group with less traffic. A storage apparatus shown in FIG. 12 is virtually the same as that shown in FIG. 11 except that certain components not essential to the description of channel adapters and the like are omitted from FIG. 12. In the case of a storage apparatus shown in FIG. 12, the loads generated by the hosts are distributed more uniformly among parity groups. Thus, the throughput of the storage apparatus as a whole is increased.

However, if the destination parity group also had a high utilization, then the system reconfiguration performed above may not significantly alleviate the congestion problem in the storage subsystem, and may even worsen the situation. In order to solve the above problem, in accordance with the present embodiment, a history of I/O requests for each logical volume, logical unit, or storage disk is maintained in the storage subsystem, including frequency of the I/O request over a given period of time. Alternatively, the raw I/O request information may be stored, and the frequency may be calculated subsequently as the need arises, such as when a system reconfiguration is being considered. The management program or agent provides this information when a system administrator is considering a system reconfiguration to redistribute the loads in the storage subsystem. In addition, the management agent may provide a simulation of the effects of the load redistribution being considered by the administrator, e.g., relocating the logical volumes 0 and 1 of the parity group 2-2 to the logical volumes 0 and 1 of the parity group 1-1.

In one embodiment, association of I/O requests from the information-processing apparatus or hosts 1101, 1102 and 1103 with actual physical locations on magnetic disks is managed in the magnetic disks using the pass information and/or the location information described above. Thus, by having a magnetic disk correct these pieces of information, the throughput can be increased without increasing loads borne by the hosts 1101, 1102 and 1103.

A table showing location information indicating which parity group includes a specified logical volume is stored in a memory (not shown) in the disk adapter (DKA) shown in FIG. 11 or a memory (not shown) to be read out and managed by a processor. Thus, by modifying this location information, the information associating logical volumes with parity groups can be changed.

In the storage device shown in FIG. 8, data to be written is received from the host 50 through the channel port 21 and temporarily stored in the cache memory 24 before being distributed and stored in a plurality of magnetic disk drives 31 employed in the disk array 30 along with redundant data generated from the data to be written.

In addition, a read request may also be received from the host 50. In response to such a request, the data is read out from the disk-array apparatus 10 and supplied to the host 50 by way of the cache memory 24 and the channel port 21.

In order to implement a management method provided by this embodiment, the service processor 40 employed in this embodiment is provided with software (a management agent) having a typical structure like one shown in FIG. 9. In one embodiment, the service processor 40 includes a microprocessor provided in the storage subsystem and a service computer (not shown) that is coupled to the microprocessor via a local area network. The service computer is a notebook in one embodiment. Alternatively, the service processor 40 comprises a service computer that is coupled to the storage subsystem via a local area network. The management agent is stored in a storage area of the service computer in one embodiment.

The software or management agent comprises maintenance-management application programs for executing control to display a series of screens to be described later. As shown in the figure, the maintenance-management application programs include a DKC communication task 40a, a monitoring task 40b, a computation task 40c, a configuration-information acquisition task 40d, a service program 40e, a communication program 40f, a JNI (Java Native Interface) interface 40g, an RMI server 40h and a JAVA applet 40i. The DKC communication task 40a and the monitoring task 40b collect monitored data 80 (see, FIG. 10) from the channel adapter 22, the disk control adapter 23 and other sources. The computation task 40c computes, among others, utilization rates of a variety of resources for displaying performance or other purposes. The configuration-information acquisition task 40d acquires information on the configuration of the entire system. The service program 40e controls tasks in accordance with requests received from an external source. The communication program 40f controls information exchanges with external modules. The JNI interface 40g is written typically in JAVA language. The JAVA applet 40i executes control of user interfaces such as screens (monitor screens) including data inputs, to be described later by referring to FIGS. 1 to 7.

In addition, a remote management terminal 60 connected to the service processor 40 by an information network 70 also has a JAVA applet 60a for presenting user interfaces in a way similar to the JAVA applet 40i of the service processor 40 to the user of the remote management apparatus 60. The user includes a person in charge of storage-system management. Accordingly, the remote management terminal 60 executes or cooperates with the management agent associated with the service processor 40 to perform system reconfiguration. In contrast to the service computer associated with the service processor 40, the remote management terminal 60 is provided at a significant distance from the storage subsystem. For example, the service computer may be provided in the same chassis of the storage subsystem or a proximate location thereof, whereas the remote management terminal 60 is located at another building. Therefore, the service processor 40, the remote management terminal 60, the service computer, and the management agent are used to perform system configuration or retrieve information needed to perform the system configuration.

In one embodiment, a storage system includes the service processor 40 and the management agent as a system management device 150 (FIG. 8) that performs system configuration or gathers system performance information (bandwidth utilization information), where the management device does not include the remote management terminal. In another embodiment, the management device includes the remote terminal 60 and the management agent, but not the service processor 40. In yet another embodiment, the management device includes both the service processor and the remote terminal. Each of the service processor and the remote terminal includes at least one display area for displaying user interface information, such as illustrated in FIGS. 1-7. As used herein, the term "system management device" refers to an information processing unit that includes software, e.g., the management agent, that initiates or causes performance of system configuration or reconfiguration of a storage subsystem or that initiates or causes retrieval of bandwidth utilization information of a storage subsystem.

As described earlier, the JAVA applet 40i and the JAVA applet 60a executes appropriate controls to display user interfaces, such as FIGS. 1-7, used in the present embodiment. That is, the JAVA applet 40i and the JAVA applet 60a each utilize a remote-procedure-calling function in a JAVA environment provided by the RMI server 40h to give commands to the service program 40e through the JNI interface 40g and the communication program 40f. The commands include a command to change the system configuration, a command to collect statistical information on, among others, operating status, and a command to compute performance indicators before and after a change in system configuration.

FIG. 10 is a diagram showing typical monitored data 80 collected by the management method provided by this embodiment. Exemplary collected items of the monitored data 80 in this embodiment are explained as follows. [0040]

<items 80a and 80b>

An item 80a is the number of input/output processes performed per second (IO/s) or a data transfer rate (MB/s) for each WWN (World Wide Name), which is the identification of each channel port 21, typically implemented as a fiber channel. By the same token, an item 80b is the number of input/output processes performed per second (IO/s) or a data transfer rate (MB/s) for each WWN group, which is a set consisting of a plurality of channel ports 21. As used herein, the channel port 21 refers to a connection or a set of connections that are linking the host and the disk-array apparatus.

<Item 80c>

An item 80c is the number of input/output processes performed per second (10/s) or a data transfer rate (MB/s) for each port (or each channel port 21) in each channel adapter (CHA) 22. The item 80c also includes the utilization rate of the channel processor (CHP).

<Item 80f>

An item 80f is the rate of utilization of the disk processor (DKP) constituting the disk control adapter 23.

<Item 80h>

An item 80h includes the number of input/output processes performed per second (IO/s), a cache hit rate and a rate of utilization, which are collected for each parity group comprising a disk array 30.

<Item 80i>

An item 80i includes the number of input/output processes performed per second (IO/s), a cache hit rate and a rate of utilization, which are collected for each logical volume set in a disk array 30.

The monitor data 80 above relate to bandwidth utilization information. As used herein, the term "bandwidth utilization information" refers any information that provides information about amount of data transfer handled by a component within a storage subsystem or about effectiveness of handling of data transfer requests by a component within the storage subsystem. The items 80a-80i are examples of types of information included in the bandwidth utilization information.

Figure 1:
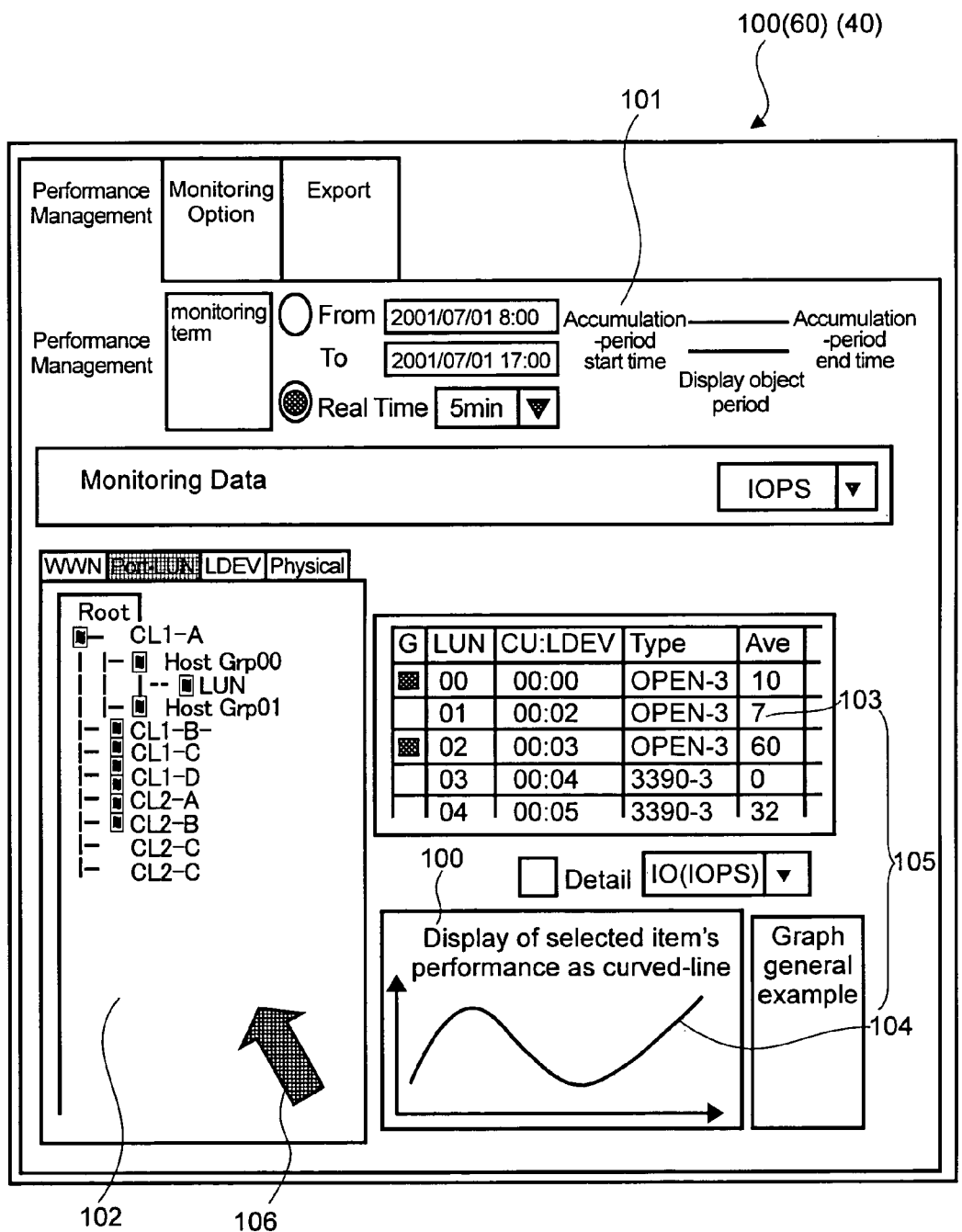
FIG. 1 is a conceptual diagram showing a typical operation screen in a management apparatus adopting a storage-device management method provided by an embodiment of the present invention.

Typical operations of this embodiment's management method and management apparatus are explained by referring to, among others, the typical display screens shown in FIGS. 1 to 7 and other figures. FIG. 1 is a conceptual diagram showing an exemplary main screen presented to the user by the JAVA applet 40i of the service processor 40 and/or by the JAVA applet 60a of the remote management terminal 60 accordingly to one embodiment of the present invention. The JAVA applet 40*i* and the JAVA applet 60*a* are each executed as a maintenance-management application program for implementing the management method provided by the embodiment.

The main screen 100 shown in FIG. 1 comprises a display-period-setting panel 101 at the top portion, a configuration display panel or window 102 on the left side and a performance display panel or window 105 on the right side. The display-period-setting panel 101 is used for setting a display period of performance. The configuration display panel 102 shows the configuration of the entire storage subsystem, i.e., providing physical and logical hierarchical relationship among parity groups, logical volumes, disk drives. In one embodiment, the display window 102 shows the entire configuration of more than one storage subsystems that are included in a common storage network. If the storage subsystem has too many components to be fitted into the space provided within the configuration display panel 102, a scrolling bar or function may be provided to enable the user to view additional components. As used herein, the displaying method utilizing the scrolling functions will be deemed to have displayed the entire configuration in a single screen.

The performance display panel 105 shows the performance of the disk-array apparatus or storage subsystem 10. The performance display panel 105 comprises a list table 103 showing a list of performance values provided typically for each logical volume. The performance display panel 105 also includes a graph 104. A performance value displayed in the list table 103 and the graph 104 is updated accordingly to a period selected in the setting period panel 102. Accordingly, the list table 103 and graph 104 provides bandwidth utilization information for selected instances. The user may view the bandwidth utilization information or bandwidth performance data for selected components for a selected period of time by referring to the display-period-setting panel 105.

Figure 2:
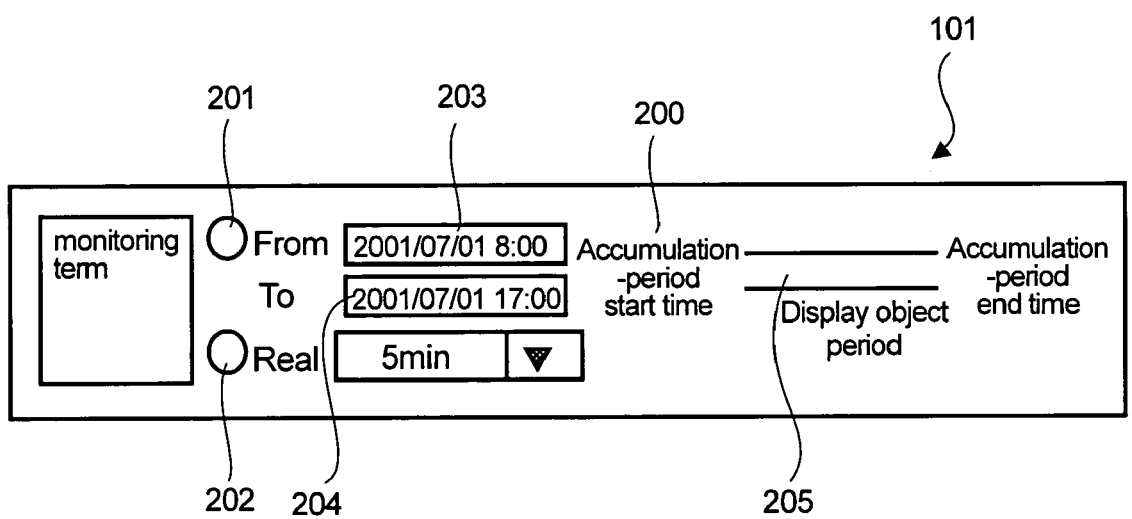
FIG. 2 is a conceptual diagram showing a display-period-setting panel of the operation screen of FIG. 1 according to one embodiment of the present invention.

In operation, the configuration display panel 102 is used to select the component of interest to a user. The user places a cursor 106 of a mouse at a given position in the configuration display panel 102 and selects an icon to view in more detail. Examples of configurations displayed on the panel 102 are logical volumes and World Wide Number (WWN). The pointer cursor 106 is referred to hereafter as a mouse for the sake of simplicity. The list table 103 and the graph 104 each display performance data of a selected configuration element in a manner locked with data appearing on the configuration display panel 102. By using the main screen 100, the person in charge of storage-system management (administrator) may view the configuration of the entire subsystem (scrolling may be needed to view additional components) and bandwidth performance data associated with each configuration element therein, thereby enabling the administrator to easily visualize the entire configuration of the entire disk-array apparatus and quickly identify any component that needs to be changed in order to more uniformly distribute the loads over the system. Examples of the component are a logical volume, a port, a disk drive, parity group, and logical unit. 1711 The display-period-setting panel 101 extracted from the main screen 100 is shown in FIG. 2. As shown in the figure, the display-period-setting panel 101 includes a past-data display button 201 for displaying data stored in the past and a real-time display button 202 for displaying current performance values. The user selects one of display methods represented by these buttons according to application desired. If the past-data display button 201 is selected, the user inputs a display period of interest into a display-period-start box 203 and a display-period-end box 204. In addition, a period can be set with ease by selecting a time period along a timeline bar 205 using a mouse.

The user selects the past-data display button 201 or the real-time display button 202 to select types of information to be displayed on the screen from various bandwidth performance data. If the real-time display button 202 is selected, values shown by the list table 103 appearing on the main screen 100 are updated dynamically at fixed intervals. If the past-data display button 201 is selected, on the other hand, the list table 103 shows performance data corresponding to the selected period that have been previously stored in a database.

Performance data corresponding to the selection made on the display-period-setting panel are provided in the list table 103 and the graph 104. The user obtains information on performance characteristics of the entire apparatus from past data and set control parameters. Accordingly, the user may view the effects of the new configuration in real time. In one embodiment, a plurality of set values each representing a time segment are prepared in advance as a display period described above. Typical time segments are time bands such as a job period, a night job period and a start job period. A time band is then selected as a display period by using the setting panel shown in FIG. 2. An effect can then be verified.

Figure 3:
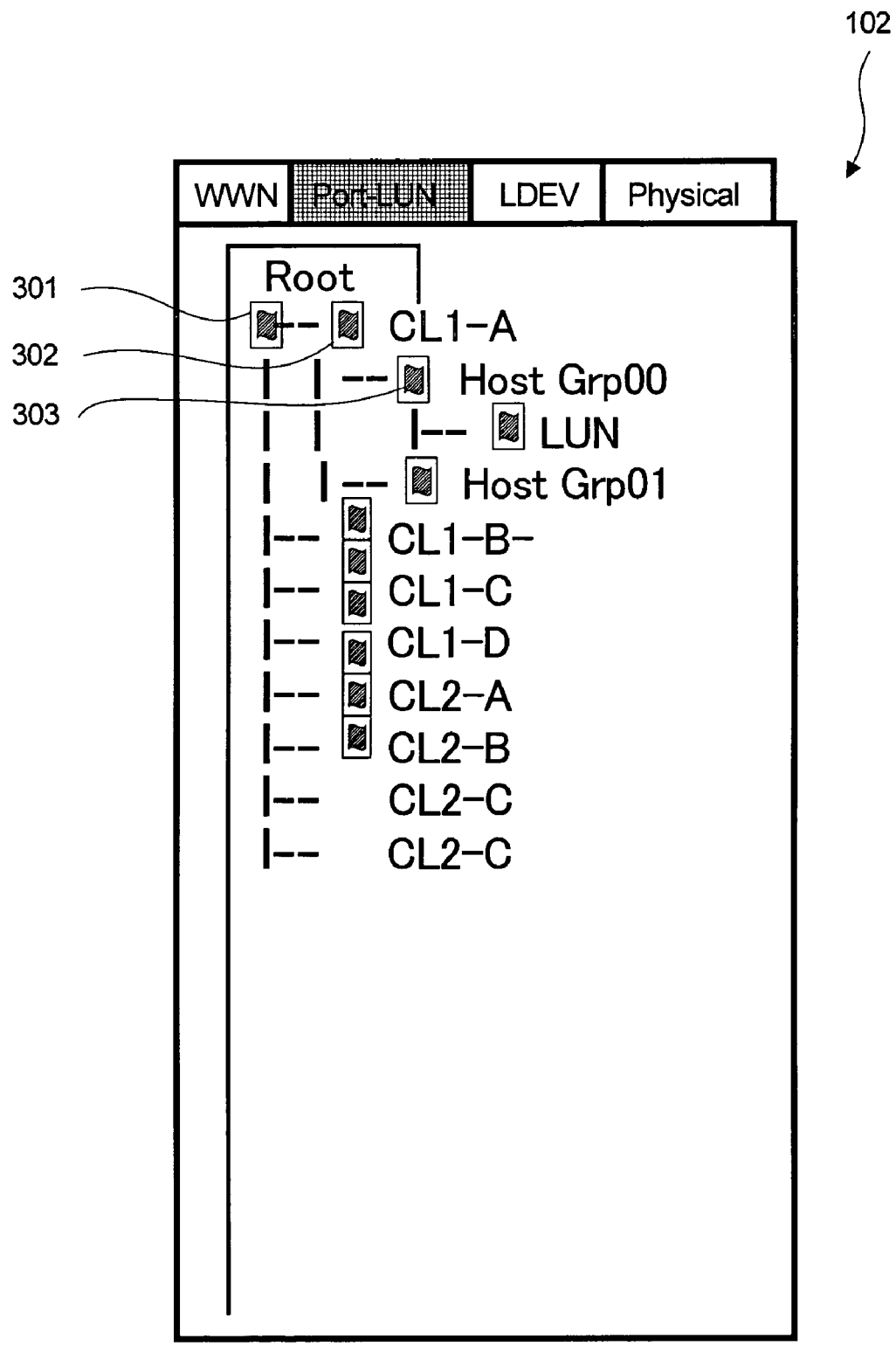
FIG. 3 is a conceptual diagram showing a configuration display panel of the operation screen of FIG. 1 according to one embodiment of the present invention.

The configuration display panel 102 of the main screen 100 is shown in FIG. 3. As shown in the figure, the configuration display panel 102 shows the configuration of the disk-array apparatus 10 as a tree view. When a root icon 301 on the top of the tree is clicked or selected, port icons 302 of all ports are listed below the root icon 301. If a port icon 302 is clicked, host-group icons 303 associated with the port icon 302 are displayed. By displaying the configuration of the apparatus as a tree structure and displaying icons in a hierarchical format as described above, the user may easily grasp the configuration of the entire apparatus with ease.

However, the above tree description is one exemplary method, and other types of formats may be used. For example, the apparatus' various configurations representing a relation between parity groups and logical volumes, a relation between LUNs and WWNs and other relations can each be displayed by using a tree view. The information provided in the list table 103 and the graph 104 corresponds to the element selected on the display panel 102. In one embodiment, such information change dynamically as the user selects different elements in the display panel 102.

Figure 4:
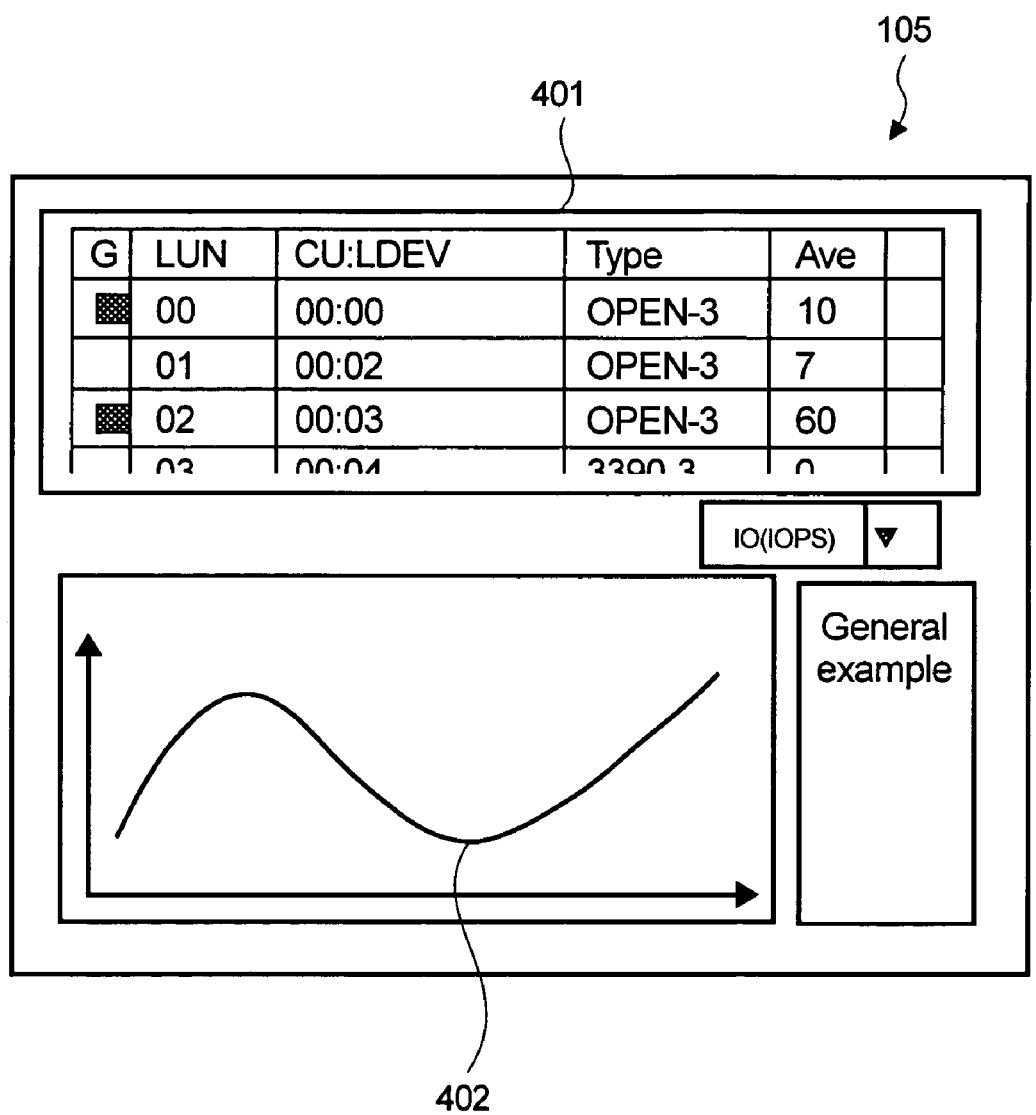
FIG. 4 is a conceptual diagram showing a performance display panel of the operation screen of FIG. 1 according to one embodiment of the present invention.

The performance display panel 105 of the main screen 100 is shown in FIG. 4. As shown in the figure, the performance display panel 105 shows measured performance data of the disk-array apparatus 10. The performance data corresponds to the setting of the display-period-setting panel 101. A performance display table 401 (that is, the list table 103) shows the performance data of at least one configuration element or component in a list-table format, e.g., an average value over a selected time period. On the other hand, a performance display graph (that is, the graph 104) 402 shows the performance over the selected time period.

In the case of a real-time display, data shown in the performance display table 401 and data represented by the performance display graph 402 are updated dynamically, where the performance display table 401 is linked with the performance display graph 402. By combining the data shown in the display-period-setting panel 101 with the data shown in the configuration display panel 102, the user is capable of grasping performance of each component of the storage subsystem. In addition, the user is also capable of knowing the performance over a given period of time from the graph display. Using these two types of information, the user may relatively easily identify a component that acts as a performance bottleneck of the storage subsystem.

Figure 5:
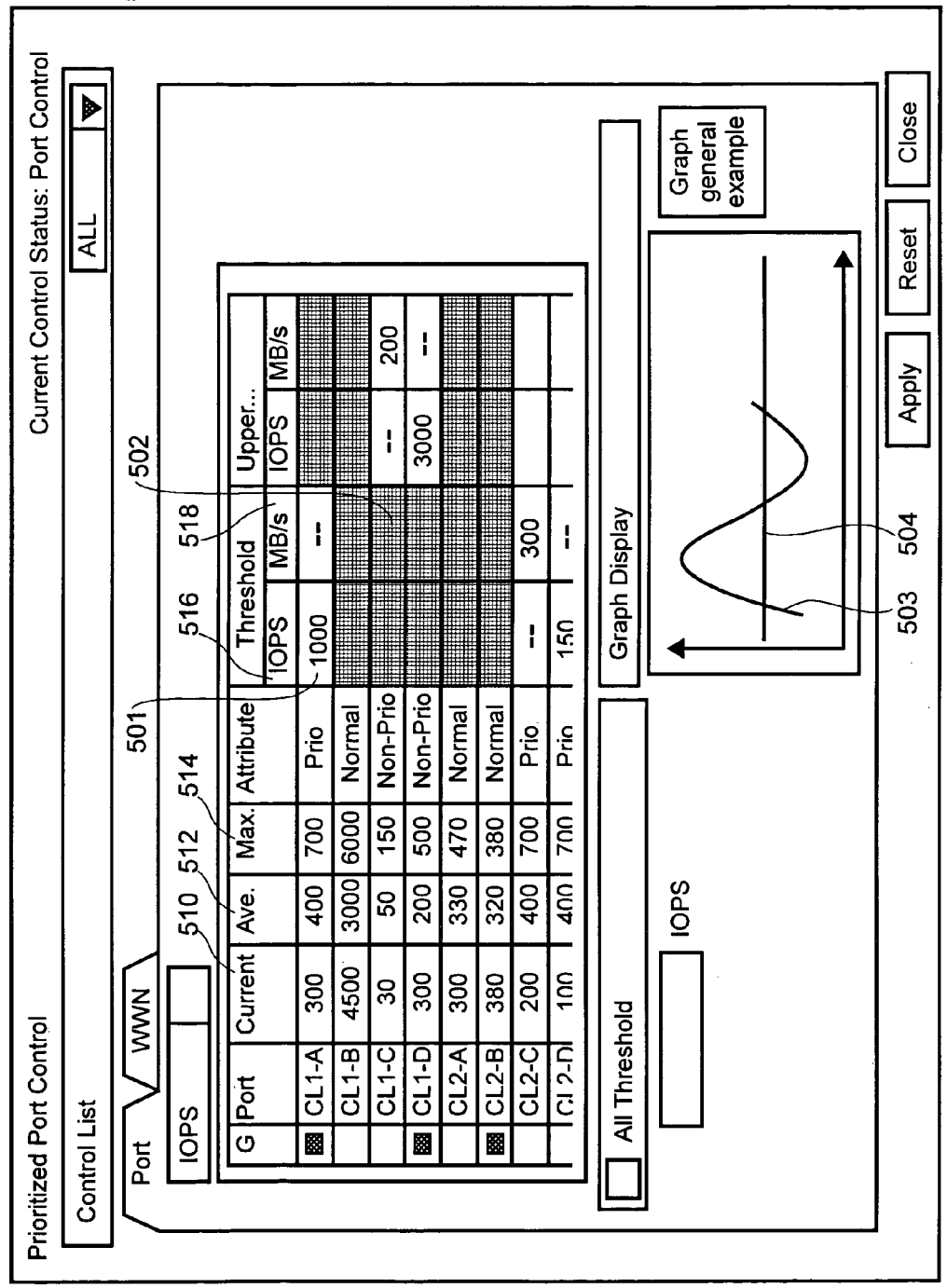
FIG. 5 is a conceptual diagram showing a parameter-setting screen of the operation screen of FIG. 1 according to one embodiment of the present invention.

FIG. 5 is a diagram showing a typical parameter-setting screen 500 used for setting parameters for controlling the performance of each port (each channel port 21) of the disk-array apparatus 10. A performance display table 501 shows measured performance values for the ports in the disk-array apparatus. The user is allowed to enter a parameter to a port-control-parameter-setting field 502 while viewing the performance values provided for fields 510, 512, and 514. The port-control-parameter-setting field 502 includes an IOPS sub-field 516 indicating I/O processes performed per second and an MB/s sub-field 518 indicating mega bits (or bytes) of data transferred per second. In addition, by displaying performance values for each port in the table 501, the user may view easily the status or load of each port relative to other ports. A performance graph 503 represents the values of a selected port over a given period. A threshold value line 504 represents the threshold value entered in the field 502. The user may visually confirm the appropriateness of the entered threshold value for the selected port by viewing the performance graph 503 and the threshold value line 504. Additionally, since the port-control-parameter-setting field 502 is displayed in a list-table format, threshold values for a plurality of ports can be inputted on a single screen without opening a separate screen. Accordingly, it is unnecessary to display a separate setting screen to input the threshold value for each port.

On the other hand, it is also possible to input new values and view the effects of the new values being considered before actually effectuating the new values. In addition, plurality of the threshold values can be inputted together to the port-control-parameter-setting field 502 from a file.

An example of a concrete relation between a parameter and a change in performance is explained as follows. With all ports having the same number of input/output processes performed per second (IO/s or IOPS), a threshold value of a specific port can be set according to the item 80c described above and upper limits can be set for the other ports. The specific port is a port for which the performance is to be increased. In this way, the number of input/output processes performed per second (IO/s) for the specific port can be increased substantially.

In addition, with the rate of utilization (described in the item 80h) varying substantially from parity group to parity group, logical volumes included in a parity group having a high rate of utilization are moved to logical volumes included in a parity group having a low rate of utilization to make the rates of utilization uniform for all parity groups to evenly distribute the loads. As used herein, the term "rate of utilization" or "utilization rate" refers to amount of maximum bandwidth used by a particular component. In one embodiment, it is an average value with respect to the maximum bandwidth.

Figure 6:
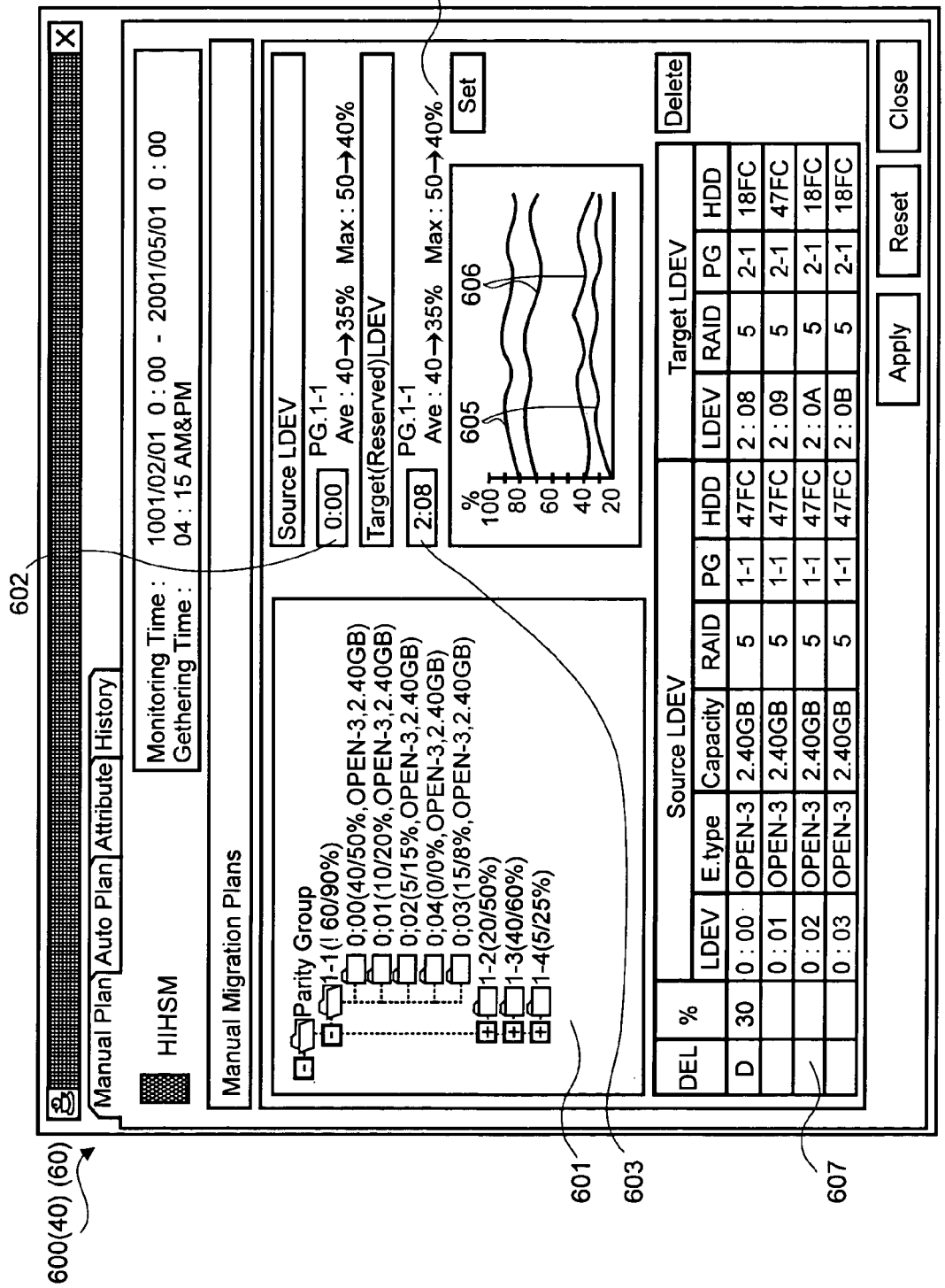
FIG. 6 is a conceptual diagram showing a configuration-change-specifying screen of the operation screen of FIG. 1 according to one embodiment of the present invention.

FIG. 6 is a diagram showing a typical configuration-change-specifying screen 600 used for reconfiguring the layout of logical volumes in the magnetic-disk-array control apparatus, i.e., to perform system reconfiguration. The configuration of the entire apparatus is displayed as a tree view 601 representing the structure. In another embodiment, the tree view 601 displays a plurality of parity groups but not the entire groups.

The user selects two logical volumes from this configuration and enters one of the two selected logical volumes to a logical-volume-movement-origin input section 602 (or source section) and another to a logical-volume-movement-destination input section 603 (destination section). The source section 602 receives the logical volume that is to be relocated to another location, e.g., to another parity group, to more evenly distribute the loads. In one embodiment, two elements of the tree view 601 are inputted to the source section 602 and destination section 603, respectively, using a drag and drop operation. In a large storage subsystem, a user may need to scroll down to a desired destination location in the tree view 601. In the present embodiment, a system administrator or user may select the source logical volume and a destination logical volume in the same screen without needing to refer to a multiple screens, thereby simplifying this particular system reconfiguration process. 1841 When the logical volumes are inputted to the source and destination sections 602 and 603, an expected change in rate of utilization is displayed on a post-movement expected-utilization-rate frame 604. In addition, a pre-movement utilization-rate graph 605 and a post-movement utilization-rate graph 606 appear at the same time in a graph-display window, so that the system administrator may view a simulated effect of the load redistribution (system reconfiguration) being considered by the administrator. A plurality of system reconfiguration operations is displayed in a list table 607. In one embodiment, the plurality of reconfiguration operations may be executed together with a single command. By merely looking at this screen, the user is capable of grasping an expected value of the rate of utilization after the logical volume reconfiguration. In addition, operations such as cancellation of a logical volume's movement can also be carried out by using the same screen.

Figure 7:
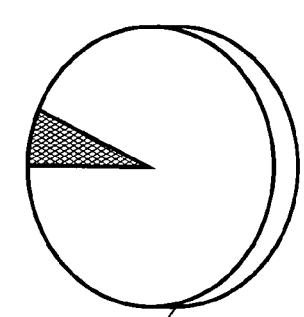
FIG. 7 is a conceptual diagram showing a function-setting screen of the operation screen of FIG. 1 according to one embodiment of the present invention.

FIG. 7 is a diagram showing a typical function-setting screen 700 for executing a function to make one or more logical volumes of the disk-array apparatus 10 reside in a cache. The configuration of the apparatus is displayed as a tree view 701 on the left upper portion of the screen. If a logical volume is selected from the 701, detailed information on the selected logical volume is displayed in a list table 702 appearing on the right upper portion of the screen. While looking at the list table 702, the user enters a set value to a parameter-setting frame 704 displayed on the right lower portion of the screen. An inputted value is shown as a circle 703 allowing the user to grasp an effect of the set value.

FIG. 13A is a diagram showing a state in which a logical volume has been selected as a source. The selected logical volume is an "OPEN-3 2.29 GB volume." It is preferably to select a destination logical volume having the same performance capability as the source logical volume, e.g., both logical volumes have the same storage capacity, according to one embodiment of the present invention. FIG. 13B is a diagram showing one or more "OPEN-3 2.29 GB logical volumes" that are suitable as the destination logical volume. In one embodiment, an arrow is provided next to each possible candidate for the destination logical volume for the convenience of the system administrator.

On the other hand, logical volumes that cannot serve as candidates for the destination logical volume are displayed differently than from the possible candidates for easy differentiation. By displaying the other logical volumes differently instead of hiding them, the administrator is provided with more information, providing the operator with information to verify the reasons why certain logical volumes can or cannot serve as candidates for the destination logical volume. Thus, the operator is capable of recognizing appropriateness of an operation carried out presently. If the disqualifying logical volumes are not displayed, the administrator cannot determine why a particular logical volume cannot serve as the destination logical volume.

As described above, in accordance with this embodiment, a system administrator of the disk-array apparatus 10 may easily grasping the configuration of the apparatus and information on performance from a variety of operation screens displayed by a management application of the service processor (SVP) 40, the remote management terminal 60 and the like as shown in FIGS. 1 to 7. Thus, it is possible to view a simulated effect of reconfiguring a member or component in order to optimize the performance of the disk-array system 10.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A management method for a storage system including a storage subsystem configured to store data, a host computer configured to communicate data with the storage subsystem, and a system management device configured to provide management functions to the storage system, the storage subsystem including a plurality of components, the method comprising:

displaying a configuration window on a display area of the system management device, the configuration window providing a view of a configuration of the plurality of components in the storage subsystem and load information for each of the plurality of components, and allowing a user to enter proposed adjustments to configuration information for at least one of a logical or physical configuration of said storage system and an operational status;

displaying a performance window on the display area of the system management device together with the configuration window, the performance window providing bandwidth utilization information relating to at least one of the plurality of components in the storage subsystem, the performance window allowing the user to enter proposed adjustments in performance through a setting of various performance parameters;

displaying at least one of a real-time mode graph and a performance history mode graph of the at least one component whose bandwidth utilization information is being displayed on the performance window, the displayed graph being dependent upon a selection of the user, the real-time mode dynamically providing the bandwidth utilization information and the performance history mode providing the bandwidth utilization information for a given period in the past, the configuration window, the performance window, and the graph being displayed together on the same display area to be viewed by a user at the same time;

simulating performance of at least one of the plurality of components in the storage subsystem based on the proposed adjustments to the configuration parameters and performance parameters, whereby the user is able to compare simulated performance using the proposed adjustments to past performance as displayed in the graph, such that the user is able to alter the proposed adjustments and view the simulated results in real-time before applying the proposed adjustments to the storage subsystem;

displaying a setting window on the display area of the system management device, said setting window including a configuration change screen comprising a configuration area for displaying configuration information for storage volumes among the plurality of components, a list area for displaying a correspondence relationship that the user is able to indicate between a source volume and a target volume for data migration, and a graph area for displaying a performance graph able to show performance of at least one of a prior and a present source and target volume and a simulating graph able to show a simulated performance of at least one of the prior and the present source and target volume based on applying the correspondence relationship; and indicating a candidate target volume that is able to migrate the data stored in the selected source volume and a non-candidate target volume with a different identifier.

2. The method of claim 1, wherein the configuration information is provided in a hierarchical format.

3. The method of claim 2, wherein the plurality of components are one of the following: magnetic disk drives, optical disk drives, logical volumes, logical units, parity groups, and one or more communication connections linking the storage subsystem and the host computer.

4. The method of claim 1, wherein the storage subsystem is a disk-array apparatus including a plurality of magnetic disk drives.

5. The method of claim 1, wherein the storage system is a storage area network including a client and a server, wherein the host computer is the server.

6. The method of claim 1, wherein the at least one of the plurality of components for which the bandwidth utilization information is displayed on the performance window is selected by selecting the at least one of the plurality of components from the configuration window using a drag-and-drop operation.

7. The method of claim 1, further comprising: storing bandwidth utilization information for the plurality of components of the storage subsystems;

selecting a component for which a system reconfiguration is to be performed;

calculating an effect of implementing the selected system reconfiguration on performance of the selected component using the stored bandwidth utilization information; and displaying a result of the calculated effect of implementing the selected system reconfiguration.

8. The method of claim 7, wherein the displaying-a-result step includes providing a graphical view of the bandwidth utilization information before and after the system reconfiguration implementation.

9. The method of claim 1, wherein the storage subsystem is a disk-array apparatus having at least 1000 magnetic disk drives.

10. The method of claim 1, wherein the plurality of components displayed are a plurality of logical volumes defined in the storage subsystem, the method further comprising:

selecting a first logical volume displayed in the configuration window, the first logical volume being associated with a first parity group experiencing a first utilization rate;

selecting a second logical volume displayed in the configuration window, the second logical volume being associated with a second parity group experiencing a second utilization rate that is lower than the first utilization rate; and displaying simulated bandwidth utilization information of at least the first parity group if the first and second logical volumes are reconfigured to be associated with the second parity group and the first parity group, respectively, wherein the storage subsystem includes location information that provides information about logical volumes associated with the first parity group and logical volumes associated with the second parity group, wherein the logical volume reconfiguration involves modifying the logical information.

11. A method for performing a system reconfiguration of a storage system, the method comprising:
displaying a configuration window visually showing a configuration of a plurality of components in the storage system and load information for each of the plurality of components within an operation screen, the operation screen allowing a user to select one or more components to be reconfigured;
displaying a performance window within the operation screen, the performance window providing bandwidth utilization information of one or more of the components in the storage system that has been selected using the configuration window, the configuration window, performance window, and the input area all being viewable at the same time and on the same display area without activating another operation screen;
receiving at least one of a proposed change in performance through a setting of various performance parameters and a proposed change in configuration information for at least one of a logical or physical configuration of said storage system and an operational status; and
simulating performance of the storage system using the proposed changes and allowing the user to compare the simulated performance with past performance, whereby the user is able to adjust the proposed changes and view the simulated results in real-time before applying the proposed changes to the storage system;
displaying a setting window including a configuration change screen comprising a configuration area for displaying configuration information for storage volumes among the plurality of components, a list area for displaying a correspondence relationship that the user is able to indicate between a source volume and a target volume for data migration, and a graph area for displaying a performance graph able to show performance of at least one of a prior and a present source and target volume and a simulating graph able to show a simulated performance of at least one of the prior and the present source and target volume based on applying the correspondence relationship; and
indicating a candidate target volume that is able to migrate the data stored in the selected source volume and a non-candidate target volume with a different identifier.

12. The method of claim 11, further comprising:
selecting one of the plurality of components to be reconfigured from the configuration window; and
indicating, in the configuration window, one or more candidate components that are capable of cooperating with the selected component to implement the reconfiguration.

13. The method of claim 11, wherein the operation screen is displayed in a display area of a service processor provided proximate to a storage subsystem of the storage system or a display area of a remote control terminal that is provided remote from the storage subsystem.

14. A management method according to claim 1, wherein the configuration information includes at least pass information that associates the logical volumes with a corresponding logical unit and location information that associates a particular parity group with one or more logical volumes.

15. A management method according to claim 1, wherein if all ports have substantially the same number of input/output processes performed per second, a threshold value of a specific port is settable to a higher limit than for the other ports via said performance window.

16. A management method according to claim 1, wherein if a rate of utilization is different between parity groups, logical volumes included in a parity group having a high rate of utilization are moveable to logical volumes included in a parity group having a low rate of utilization via said configuration window.

17. A management method according to claim 11, wherein the configuration information includes at least pass information that associates the logical volumes with a corresponding logical unit and location information that associates a particular parity group with one or more logical volumes.

18. A management method according to claim 11, wherein if all ports have substantially the same number of input/output processes performed per second, a threshold value of a specific port is settable to a higher limit than for the other ports via said performance window.

19. A management method according to claim 11, wherein if a rate of utilization is different between parity groups, logical volumes included in a parity group having a high rate of utilization are moveable to logical volumes included in a parity group having a low rate of utilization via said configuration window.

* * * * *